W. I. WENTWORTH.
SOLE PLANING MACHINE.
APPLICATION FILED JULY 8, 1912.
1,190,495. Patented July 11, 1916.
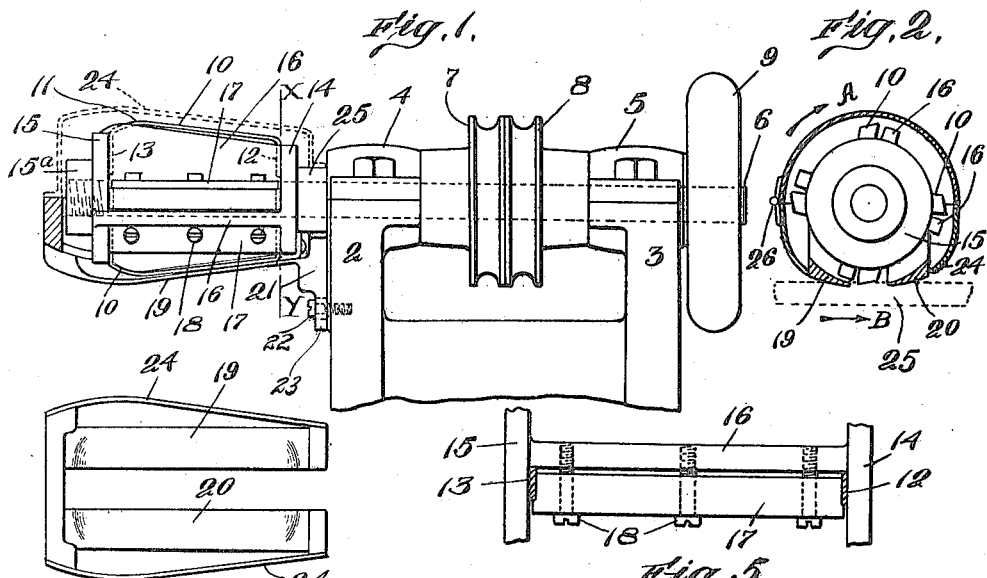
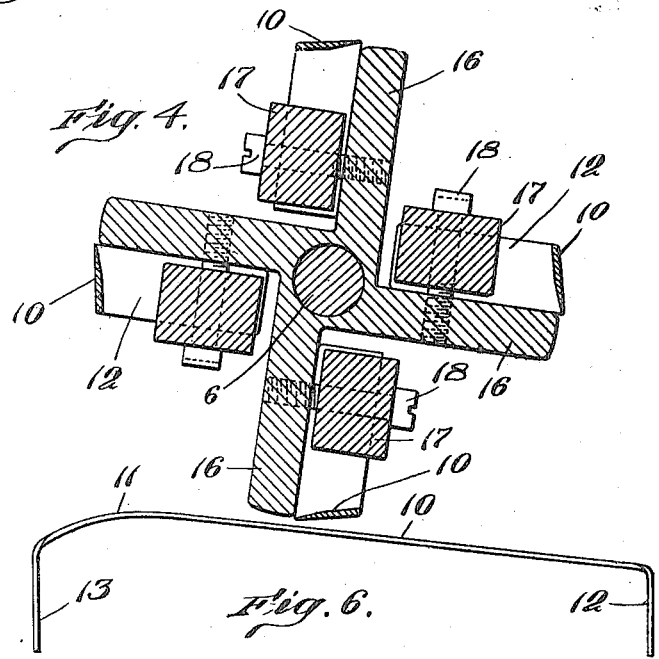
Witnesses:
Edward Maxwell
James R. Hodder
Inventor:
Winslow I. Wentworth,
by Geo. H. Maxwell,
Attorney.

UNITED STATES PATENT OFFICE.

WINSLOW I. WENTWORTH, OF BROCKTON, MASSACHUSETTS.

SOLE-PLANING MACHINE.

1,190,495.    Specification of Letters Patent.    Patented July 11, 1916.

Application filed July 8, 1912.    Serial No. 708,169.

*To all whom it may concern:*

Be it known that I, WINSLOW I. WENTWORTH, a citizen of the United States, and resident of Brockton, county of Plymouth, State of Massachusetts, have invented an Improvement in Sole-Planing Machines, of which the following description, in connection with the accompanying drawings, is a specification, like letters on the drawings representing like parts.

My invention relates to machines for operating upon the soles of boots and shoes, and particularly to planing or smoothing the soles before they are incorporated in the shoes.

The sole blanks ordinarily used in modern shoe manufacturing are of relatively heavy leather and have various imperfections upon the outer or grain side, such as wrinkles, grooves, scratches, etc., which must be removed before the sole blank is incorporated in the shoe. Heretofore it has been customary for an operator to smooth or plane the grain side of the sole in order to remove such imperfections, which planing has been done by hand, and by means of a sharp hand knife to pare or shave off the sole in a manner to remove such imperfections. If the imperfections consisted in wrinkles or raised parts to be removed the operator simply cut them off on a level with the surface of the sole, but where the imperfection was a groove, scratch, or depression, it was necessary for the operator to flex the sole sufficiently to enable him to shave or plane out the depression. This hand process of planing required high priced and skilful labor and yet it was slow and tedious, was incapable of properly planing the surface of the soles in a uniform manner and was generally unsatisfactory. If, as was often the case, the hand operation in planing was insufficient to properly smooth the outer or grain side of the sole, such smoothing up was left for the subsequent buffing operation and, as is well known, throwing this work upon the buffing machines usually resulted in injuring or "burning" the leather and in quickly wearing out the buffing pads.

The object of my invention is to provide a machine to take the place of the hand operation of sole planing above mentioned, and to perform the sole planing operation in a more expeditious, uniform and efficient manner than heretofore.

An important feature of my invention consists in providing a machine with a planing blade or knife which is capable of removing the imperfections on the grain side of the sole as above noted, whether such imperfections are raised above the sole surface or are depressed below it, and which, therefore, is equally efficient in planing out wrinkles or scratches, grooves, etc.

As herein shown in a preferred form, I have embodied my invention in a small, compact and easily constructed machine having a plurality of planing blades adjustably mounted on a rotary shaft, together with a suitable guard and clamp adjacent to each blade. Also a conveniently arranged foot or work-rest is provided against which the work may be held, and which is preferably arranged to be adjustable to the path of operation of the planing blades.

Further details of construction, combinations of parts and important features of the invention will be hereinafter pointed out and claimed.

Referring to the accompanying drawings, Figure 1 is a side view of a machine partly in section embodying my invention; Fig. 2 is an end view of the shaft and holder carrying the planing blades with the cover and work rests shown in section; Fig. 3 is a plan view of the work-rests; Fig. 4 is an enlarged, sectional view of the planing blades and the mounting therefor; Fig. 5 is a view also enlarged showing the guard and clamp, and showing the end portions of the cutting blade illustrated in cross section, held therein; and Fig. 6 is an enlarged view of the planing blade or knife.

A small, compact bench machine is herein illustrated, having a suitable framework 1 with end standards 2 and 3 carrying therein journal bearings 4 and 5 respectively for a main shaft 6. Fast and loose pulleys 7 and 8 are mounted on said shaft intermediate the journal bearings, and a fly-wheel 9 is preferably fixed to one end of the shaft and the planing instrumentalities are arranged on the other end of the shaft 6. The planing blades or knives are provided with a straight cutting portion 10 and a comparatively short, curved portion 11, each end of the blade extending nearly at right angles to its adjacent cutting portion so as to provide lugs 12 and 13, respectively. In order to mount each cutting blade in an easily adjustable position, the shaft 6 has secured upon it hubs 14 and 15, the hub 15 being preferably threaded on to the outer end of the shaft 6 so that it may be adjusted relatively with the hub 14 to fit blades of different lengths. A locking nut 15$^a$ is also provided to hold the hub 15 in its desired position. In the machine herein shown, a plurality of cutting blades are employed, four such blades being found suitable for the best work upon ordinary sole leather which is now in general use in shoe factories. I have therefore shown four such cutting blades arranged to be carried by the hubs 14 and 15. Preferably I arrange a guard adjacent to each cutting blade, which guard has its outer edge of corresponding contour to that of the cutting edge of the blade, viz., similar to the straight portion 10 and curved portion 11 of each blade. The blade and guard are relatively movable, so that the thickness of material planed off by the blade in its operation may be determined at the will of the operator. The guards are indicated at 16 and as shown in Fig. 4, the four guards may be formed integral with each other, having the center bored to fit upon the shaft 6 and arranged to be held rigidly in clamped position between the hubs 14 and 15, or these guards may be formed integrally with one hub, herein shown as 15, see Fig. 1. If planing blades of different lengths are used, guards of suitable length may easily be substituted. Each blade 10 may be conveniently secured to a guard 16 at the desired position by means of a clamp 17, said clamp being held on to the guard 16 by means of a plurality of bolts 18, as clearly shown in Figs. 4 and 5, said clamps being of suitable length to fit against the ends 12 and 13 of the blade.

I have found it desirable to have the hubs 14 and 15 of different diameters, and, therefore, to have the blades and their adjacent guards arranged in a slightly conical form with the curved portions 11 of the blades at the larger diameter, as shown in Fig. 1. This arrangement is of advantage in operating upon the sole blanks as will be hereinafter explained.

A foot or work-rest is provided, consisting preferably of two members 19 and 20 secured to a plate 21, which plate is adjustably secured to the standard 2 by means of headed bolts 22, passing through apertures 23 in said plate which are sufficiently larger than the stems of the headed bolts to give provision for the extent of vertical adjustment desired. These work-rests 19 and 20 are of a contour corresponding to that of the planing blades having similar straight and curved portions and are in suitable positions so that they are tangential to the path of movement of the cutting blades throughout the length of their cutting portions. A cover 24 may be secured in any suitable manner, being illustrated herein as attached to a collar 25 and with the upper portion of the cover hinged at 26, so that it may be swung back out of the way to position and adjust the blades with relation to the guards as above explained. The cover extends downwardly along the sides only, leaving room for the work-rests 19 and 20 which, as shown in Fig. 2, form substantially a continuation of the cover 24, the range of vertical adjustment of said work-rests not being sufficient to prevent, substantially, such a continuation for the purpose of covering or protecting the blades.

The operation of the machine will be readily understood on reference to Fig. 2, wherein a sole blank 25 is shown in position against the work-rests, the planing blades being rotated in the direction indicated by the arrow A, and the sole being drawn by the operator across the work-rests in the direction indicated by the arrow B. The sole planing operation may be conveniently performed by the operator who sorts out the soles in the factory, such operator examining each sole for imperfections and applying such sole to my machine to remove the imperfections; preferably the work-rests are arranged as shown so that the operator holds the sole upwardly against the work-rests and pulls the sole blank toward him while the planing blades operate upon the sole to remove the imperfections. If desired, of course the work-rests may be arranged in a diametrically opposite position to that shown in the drawings, or in any other convenient place adjacent to the path of movement of the planing blades. Where the imperfection to be removed consists in a raised portion on the sole, such as that produced by a wrinkle or the like, the operator will apply the sole so that the straight portions 10 of the planing blades will operate thereon to plane and smooth the sole. Where the imperfection consists in a groove, scratch or like depression in the surface of the sole, then the operator applies the sole so that it will be operated upon by the curved portions 11 of the planing blades which will act to plane out such depression, as will be readily understood. The provision for relatively adjusting each planing blade and its adjacent guard enables the machine to plane or shave off a larger or smaller amount of stock, as may be desired by the operator, while the adjustability of the work-rests 19 and 20 relatively with the path of movement of the planing blades also affords means to determine the extent of the planing operation desired.

It will be readily appreciated that one of the important advantages of the machine of my invention is that the sole planing operation is performed by the same planing blade upon a sole blank to remove imperfections therein, whether such imperfections consist in portions of the sole raised above its surface or depressed below. The straight edges of the planing blades preferably being used to plane out the raised portions, and the curved portions of said blades being of particular utility in planing out the depressions, the variation in the extent of said curved edges affording a variable depth of the planing cut upon the sole to plane out slight or deep depressions. While I have shown the planing blades 10 as adjustable and their respective guards 16 as fixed, it is of course within the scope of my invention to reverse this arrangement, or to have each blade and its adjacent guard adjustable, the fact that the cutting edge of the planing blade and its adjacent guard are relatively adjustable being of importance.

While any suitable means to clamp and hold the cutting blades 10 may be employed, that herein shown is the best method at present known to me and it will be noted that the planing blades 16 are so mounted around the main shafts 6, that their respective cutting edges are substantially in a plane radial with said shaft, the width of each cutting blade being "backed off" or sloping downwardly somewhat to afford proper clearance in the operation of the machine as its blades pass by the work-rests 19 and 20. The guards 16 also act as blowers to remove the stock planed off and therefore to keep the work-rests clear.

I believe that I am the first to devise a planing machine, intended primarily for operation on sole blanks, capable of planing out the imperfections in said blanks, whether raised or depressed below the surface, and also to provide a planing blade adapted to perform the planing operation upon such raised or depressed portions with equal facility, and I therefore desire to claim this feature of my invention broadly.

While I have herein shown my invention as applied to a machine to operate upon sole blanks, it is of course within the scope of my invention to plane out the protuberances and depressions in a sole after it is incorporated in the shoe, but I prefer to plane out the imperfections in soles or leather by passing the same through my machine while in blank form. In the operation of my machine, I have discovered that the sole planing mechanism not only smooths out the protuberances and depressions, but tends to beat, compress and burnish the leather, greatly improving the product over the former result of hand planing, which, of course, had no such beating, smoothing, or burnishing action. I also find in practice that the guards 20 tend very effectually to prevent gouging of the knives into the leather, holding the leather downwardly and preventing it from springing against the knives, so as to insure even, smooth, planing action.

Having described my invention, what I claim as new and desire to secure by Letters Patent is:

1. In a machine for planing the grain side of soles, means to plane the surface of a sole, comprising a conical cutter having a plurality of cutting blades, each blade having a straight cutting portion adapted to plane out protuberances on said sole surface, and a curved cutting portion adapted to plane out depressions in the sole surface, means to rotate the cutter, and a work rest closely adjacent the line of rotation of said cutters and conforming substantially with the straight and curved cutting portions thereof.

2. In a machine for planing the grain side of soles, means to plane the surface of a sole, comprising a conical cutter having a plurality of cutting blades, each blade having a straight cutting portion adapted to plane out protuberances on said sole surface, and a curved cutting portion adapted to plane out depressions in the sole surface, a guard for each cutter closely adjacent the cutting edge of each blade and of substantially the same contour therewith, means to secure the cutting blades and guards in adjusted position relatively with each other, means to rotate the cutter and guards, and a workrest closely adjacent the line of rotation of said cutters and conforming substantially with the straight and curved cutting portions thereof.

3. A sole planing machine having a rotatable shaft, a plurality of planing blades, means on said shaft to carry the planing blades, each blade having a straight cutting edge and a curved cutting edge, a guard adjacent to each blade and of corresponding contour, means to adjust each blade and guard relatively to each other, and a work-rest comprising two members arranged tangentially to the path of operation of the blades, said work-rest being adjustable toward and from the path of movement of the blades, and each being substantially of corresponding contour to the cutting edge of the blades.

4. In a machine for planing the grain side of soles, means to plane the surface of a sole, comprising a conical cutter having a plurality of cutting blades, each blade having a straight cutting portion adapted to plane out protuberances on said sole surface, and a curved cutting portion adapted to plane out depressions in the sole surface, means to rotate the cutter, means to prevent the cutters gouging into the leather during the planing action, and a work rest closely adjacent the line of rotation of said cutters and conforming substantially with the straight and curved cutting portions thereof.

In testimony whereof, I have signed my name to this specification, in the presence of two subscribing witnesses.

WINSLOW I. WENTWORTH.

Witnesses:
L. E. TINELL,
MARY H. KANE.

Copies of this patent may be obtained for five cents each, by addressing the "Commissioner of Patents, Washington, D. C."